Nov. 7, 1939.  C. J. MEEK  2,179,419
COPY HOLDER
Filed April 26, 1937  4 Sheets-Sheet 1

Carey J. Meek
INVENTOR
BY Victor J. Evans & Co.
ATTORNEYS

Nov. 7, 1939.  C. J. MEEK  2,179,419
COPY HOLDER
Filed April 26, 1937   4 Sheets-Sheet 2
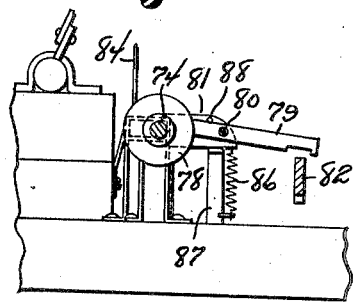
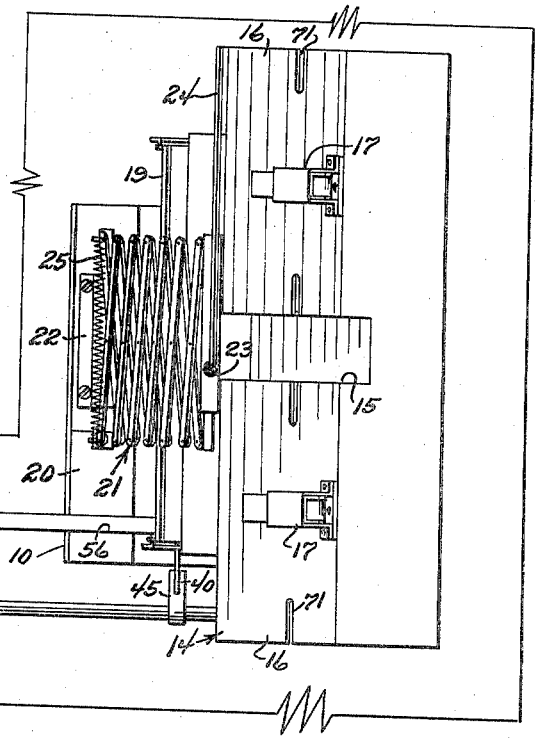
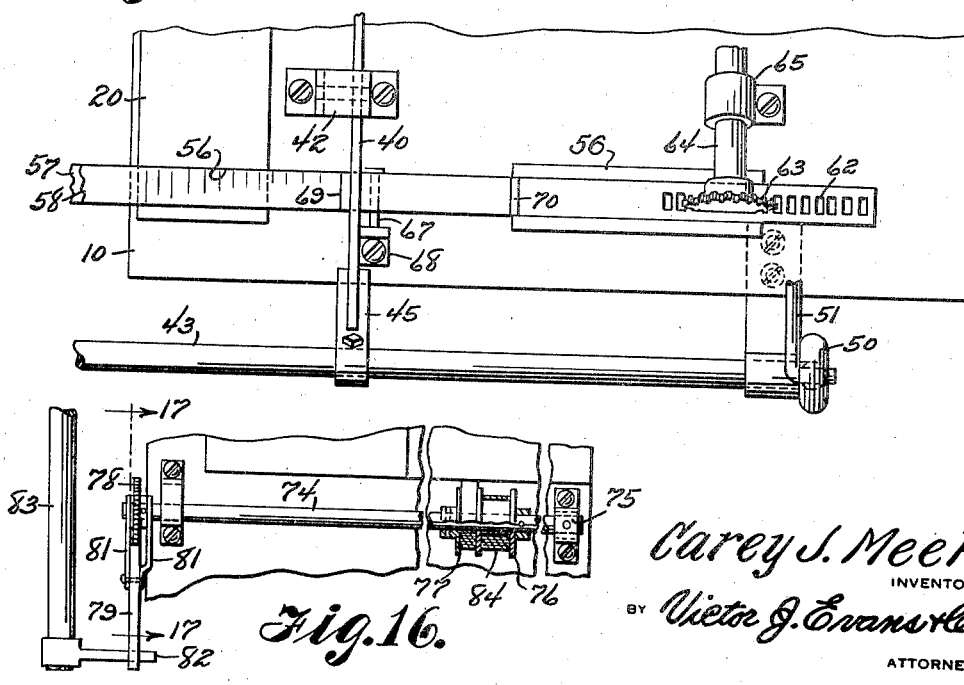
Carey J. Meek
INVENTOR
BY Victor J. Evans & Co.
ATTORNEYS Nov. 7, 1939.   C. J. MEEK   2,179,419
COPY HOLDER
Filed April 26, 1937   4 Sheets-Sheet 3
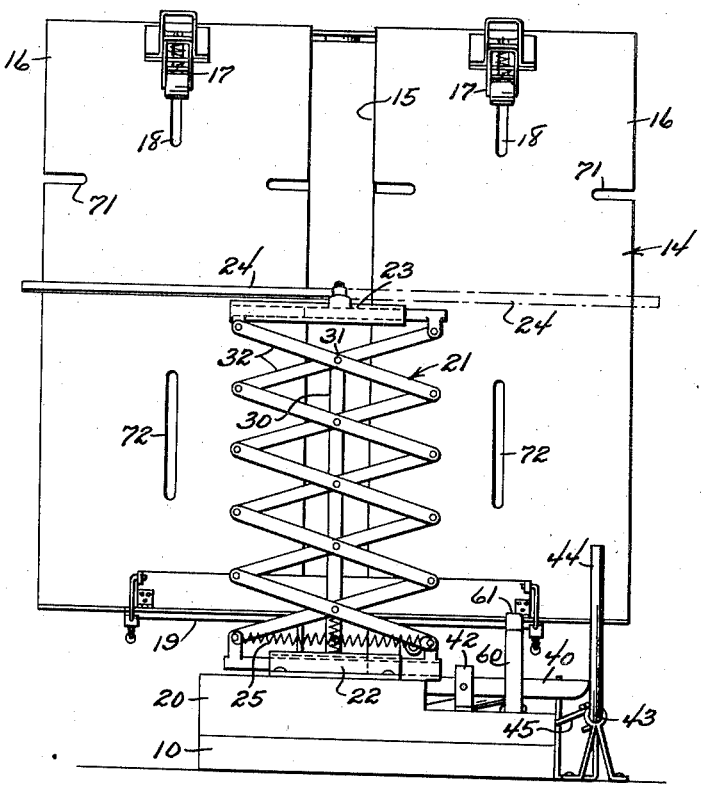
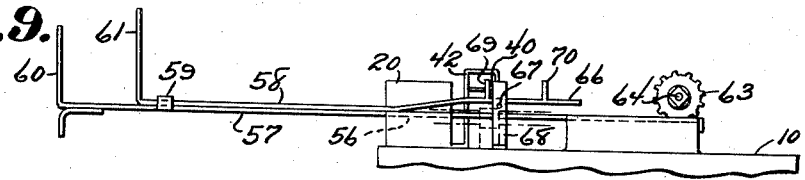
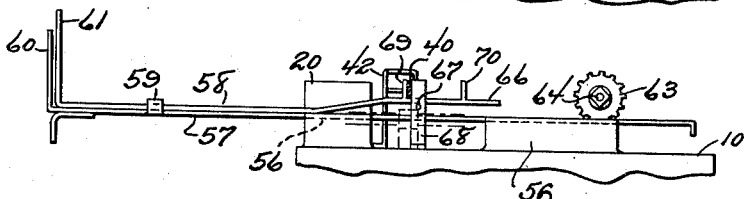
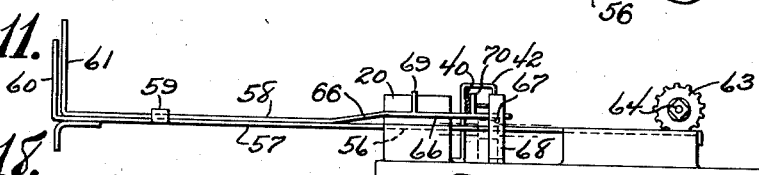
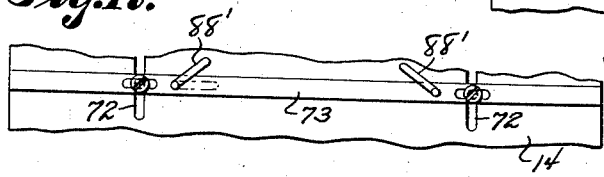
Carey J. Meek
INVENTOR
BY Victor J. Evans & Co.
ATTORNEYS Nov. 7, 1939.   C. J. MEEK   2,179,419
COPY HOLDER
Filed April 26, 1937   4 Sheets-Sheet 4

Carey J. Meek
INVENTOR
BY Victor J. Evans & Co.
ATTORNEYS

Patented Nov. 7, 1939

2,179,419

UNITED STATES PATENT OFFICE 2,179,419

COPY HOLDER

Carey J. Meek, Wheeler, Tex.

Application April 26, 1937, Serial No. 139,050

9 Claims. (Cl. 120—29)

The invention relates to a copy holder and more especially to a combined copy holder and line indicating and copy shifting mechanism.

The primary object of the invention is the provision of a device or mechanism of this character, wherein typed or written matter, whether in loose sheet form or a book, can be conveniently and easily placed therein for the holding of the same so that copying therefrom may be carried forth expeditiously, the device or mechanism including a line indicator which is automatically operative for identifying lines of the writing and a lifter which is fluid operated to raise or lower the held writing and in this manner properly supporting such writing and identifying the lines thereof during the copying period by a typist.

Another object of the invention is the provision of a device or mechanism of this character, wherein the writing can be conveniently and easily clamped or held in a supported position, the support being adjustable to properly locate the writing for copying purposes, the support for the writing being of novel construction and the control for the same conveniently located with respect to a typewriter so that it can be actuated without inconvenience to the operator of the typewriter.

A further object of the invention is the provision of a device or mechanism of this character, wherein loose sheet writings, books or the like of varying sizes can be properly supported and positioned for copy work therefrom, the device or mechanism being novel in its entirety.

A still further object of the invention is the provision of a device or mechanism of this character, which is comparatively simple in construction, thoroughly reliable and efficient in operation, convenient for a typist in the handling of writings for copy work, strong, durable, and comparatively inexpensive to manufacture.

With these and other objects in view, the invention consists in the features of construction, combination and arrangement of parts as will be hereinafter more fully described, illustrated in the accompanying drawings, which disclose the preferred and modified forms of embodiment of the invention and pointed out in the claims hereunto appended.

In the accompanying drawings:

Figure 2 is a top plan view thereof.

Figure 3 is a front elevation.

Figure 8 is an enlarged fragmentary plan view showing in detail several of the controls of the device or mechanism.

Figure 9 is a fragmentary side view thereof showing the controls in one adjusted position.

Figure 10 is a view similar to Figure 9 showing another adjusted position thereof.

Figure 11 is a view similar to Figure 10 showing a further adjusted position of the same.

Figure 16 is a fragmentary plan view partly in section of a modified form of tape control and spring slack tightener of the line indicator.

Figure 17 is a sectional view on the line 17—17 of Figure 16 looking in the direction of the arrows.

Figure 18 is a fragmentary front elevation showing in detail an auxiliary writing rest for the support of the device or mechanism.

Similar reference characters indicate corresponding parts throughout the several views in the drawings.

Figure 6:
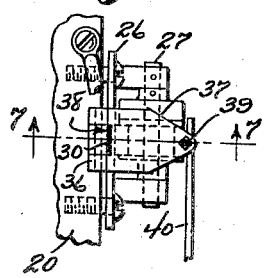
Figure 6 is a fragmentary top plan view of the actuator for the line indicator of the device or mechanism.
Figure 7:
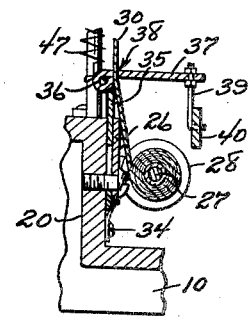
Figure 7 is a sectional view on the line 7—7 of Figure 6 looking in the direction of the arrows.
Figure 1:
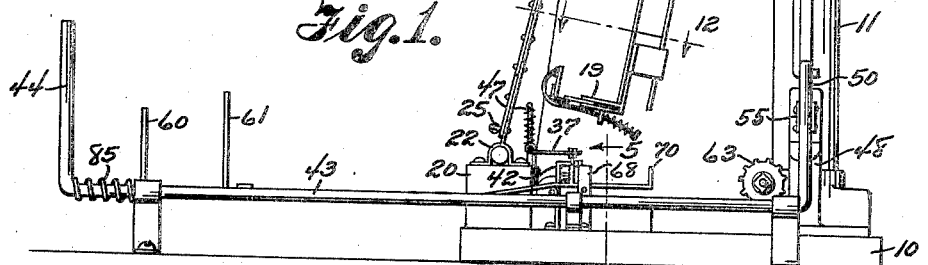
Figure 1 is a side elevation of a device or mechanism constructed in accordance with the invention.
Figure 5:
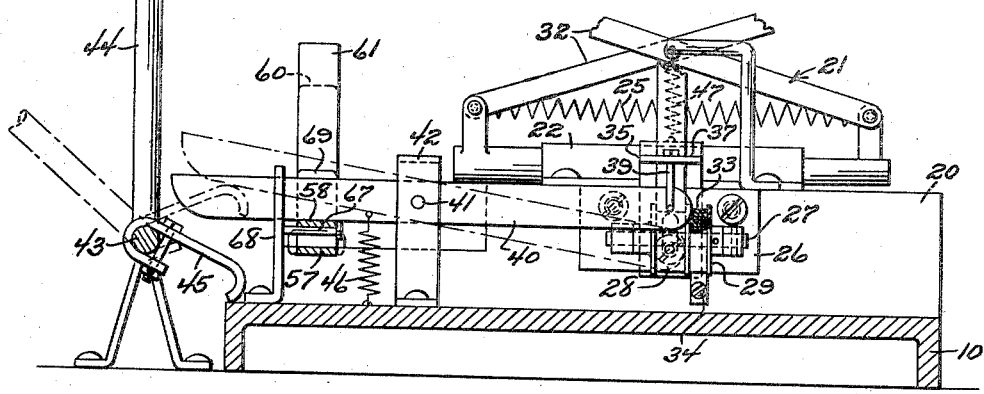
Figure 5 is a fragmentary sectional view on the line 5—5 of Figure 1 looking in the direction of the arrows.
Figure 4:
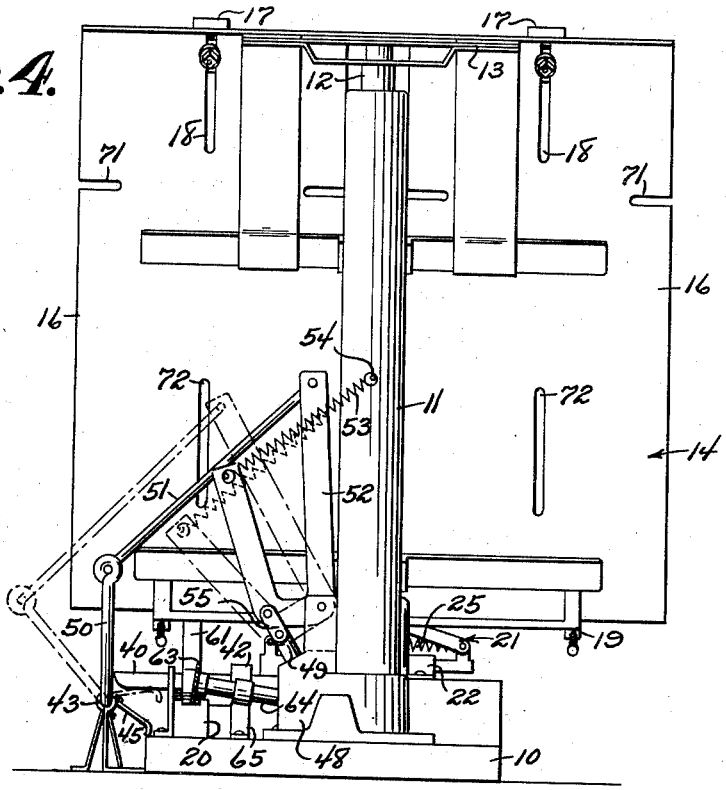
Figure 4 is a rear elevation.
Figure 12:
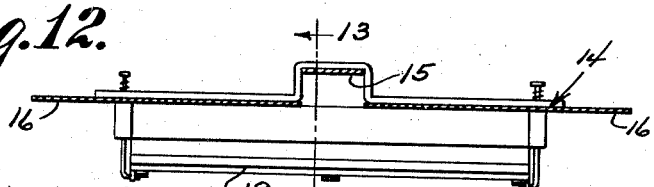
Figure 12 is a fragmentary sectional view on the line 12—12 of Figure 1 looking in the direction of the arrows.
Figure 13:
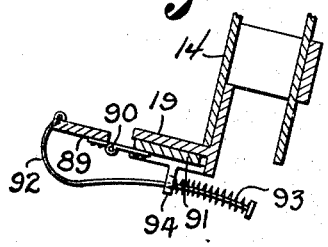
Figure 13 is a sectional view on the line 13—13 of Figure 12 looking in the direction of the arrows and showing the writing rack in open position.
Figures 14, 15:
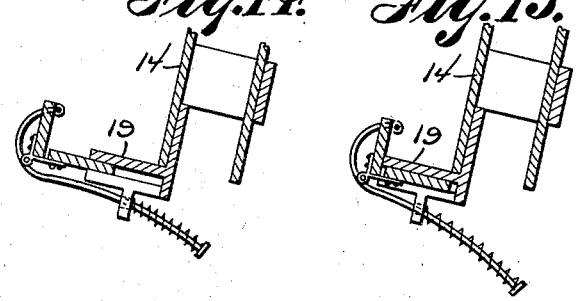
Figure 14 is a view similar to Figure 13 showing the writing rack in an adjusted and closed position.
Figure 15 is a view similar to Figure 14 showing a further adjustment of the said rack when in closed position.

Referring to the drawings in detail, the device or mechanism constituting the present invention comprises a relatively heavy flat bed or base 10 of the required shape and size and rearwardly of the same is a vertical or perpendicular fluid operated jack 11 which rises from the said bed or base the desired distance and includes the raising and lowering member 12 which at its upper end carries a head bracket 13 having fixed thereto a writing support in the form of a rest plate 14 being slightly forwardly inclined to the vertical. The plate 14 is formed centrally thereof with a channel or recess 15 providing a seat for accommodating the hinging area of the binding of a book (not shown) while the outside cover portions rest against this plate 14 at the portions 16 when the said book is open and carried by the support while the pages (not shown) are held for full reading thereof by jack knife acting releasable grips 17 which are secured to the plate 14 close to or at the uppermost end of the same and are adjustable, one located at each of the portions 16, in slots 18 provided in said plate 14, slots 18 being extended parallel with each other toward and away from the uppermost edge of the said plate. Fitted at the lower edge of the plate 14 is an extensible opening and closing rack 19 adapted to accommodate the binding and the pages of the book when on the support. This rack also accommodates loose sheet writings while the grips 17 make secure such sheets on the support when carrying the same. The rack 19 is extensible for different thicknesses of books when open and also for accommodating superimposed sheets of writings to be held on the support 14 and this rack is readily moved to open position for the introduction of the book or writings therein. The rack has at its front the vertically swingable ledge 89 being hinged at 90 to a slide 91 which is disposed at the under side of the rack and is movable outwardly and inwardly relative thereto. The ledge 89 has pivoted thereto followers 92, being spring tensioned at 93 and guided at 94, respectively, for sustaining the slide with the ledge in a retracted relation to the rack.

Upon the bed or base 10 forwardly of the support 14 is an upstanding block 20 carrying a line indicator comprising an extensible and contractible lazy-tongs 21, the lower end being swingingly supported in a bearing 22 secured to said block 20 while the upper end has the connection 23 with a line indicating bar 24, preferably of the hinged swinging type so that this bar can be arranged with relation to the writing or copy work in that in one instance it can be disposed crosswise of one page, for example, that page at the left hand side of the writing and thereafter crosswise of the opposite page or that at the right hand side of the writing whether the copy work or writing be a book, pamphlet, folder or the like. Connected with the lower end of the lazy-tongs 21 is a coiled tensioning spring 25 which exerts an extending or spreading action to said tongs and thus the latter normally will be in a full extended position locating the line bar 24 uppermost with relation to the plate 14 for indicating the highest line of the writing to be copied, the lazy-tongs 21 being contracted for the lowering of the bar 24 in a manner presently described.

Mounted on the rear face of the block 20 medially with respect to the plate 14 is a bearing fixture 26 in which is journaled a horizontally disposed rotatable shaft 27 having fixed thereon a winding and unwinding reel 28 and a spring winding and unwinding pulley 29, respectively, while attached to the reel is the winding and unwinding end of a pull tape 30 although it may be a cable, cord or the like and the opposite end of this tape is fixed to the uppermost or outermost pivot 31 for the levers 32 of the lazy-tongs 21 so that on the winding of the said tape 30 upon the reel 28 the lazy-tongs will be contracted. Fixed to the pulley 29 is the winding and unwinding end of a coiled slack take-up spring 33, the opposite end of the same being fixed at 34 to the block 20 for operation in a manner presently described.

Movably fitted with the fixture 26 is a slide 35 to which is hinged at 36 a gripping jaw 37 having a guide slot 38 therein through which is trained the tape 30 while this jaw 37 by a pivot link 39 has connection with a rocking lever 40 pivoted at 41 in an inverted U-shaped bracket 42 fixed to and rising from the base or bed 10 and thus when the said lever 40 is rocked the jaw 37 is active when swinging in one direction to ride the tape 30 and on reverse swing will cooperate with the hinged bead on the slide 35 to grip and pull upon this tape so that the lazy-tongs 21 in a step by step manner can be retracted from an extended position for the changing of the line indicating bar 24 with relation to the support constituted by the plate 14.

At one side, preferably the right hand side of the bed or base 10, is a control in the form of a turning shaft 43 having at the extreme forward end a hand crank 44 while in the path of the lever 40 on this shaft 43 is an actuator arm 45 so that the lever will be rocked on the turning of the shaft 43 and in this manner the operation of the tape 30 is had. This arm is adjustable to provide long or short strokes. The spring 33 on the pulley 29 is active on the pulling of the tape 30 for the quick winding of the said tape upon the reel 28 and thus takes up any slack in the winding of the same thereon. The lever 40 is displaceable on the pivot 41, the bracket 42 being relatively wide for allowing of such displacement longitudinally of said pivot. When the lever 40 is in one position, the arm 45 is in the path thereof and on the shifting of said lever upon the pivot 41, it can be freed from action thereon of the arm 45 for a purpose presently described.

The lever 40 has connected thereto a coiled retractile spring 46 which is also attached to the bed or base 10 and functions to hold the outer end of said lever 40 in a lowermost position while connected to the hinge end 36 of the jaw 37 is a coiled spring 47 which functions to yieldably maintain the jaw in gripping relation to the tape 30 and thus a step by step winding of the said tape upon the reel 28 can be had when the shaft 43 is intermittently turned at the crank handle 44 end.

The jack 11 has in association therewith a fluid pump 48 including a reciprocating force plunger 49 and a release valve for the fluid in the jack, preferably oil, the release valve being not shown. The rear end of the shaft 43 is formed with a crank 50 to which is pivotally connected a link 51, the latter being pivoted to a double armed pivoted trigger 52, the link 51 being connected to one of its arms while a coiled retractile spring 53 is connected to the other arm thereof and this spring is attached at 54 exteriorly to the jack while a link 55 pivotally couples the plunger 49 of the pump 48 with the said trigger 52 so that the plunger 49 can be actuated for the extending of the jack in effecting the raising of the support constituted by the plate 14. On intermittently turning the shaft 43, the plunger 49 will be operated for a step by step extension of the jack and in this manner elevating the writing support, the lowering of the jack 11 being had in a manner presently described.

Arranged in a guideway 56 in the block 20 are forwardly and rearwardly directed movably interfitted controls in the form of slides 57 and 58, respectively, the movable interconnection being had at 59 and the outer ends of these controls 57 and 58, which are in the form of slides, are provided with finger holds 60 and 61, respectively, for manual operation thereof. The slide 57 at the rear end portion thereof is provided with a toothed rack 62 meshing with a rack gear 63 fixed to a rotatable shaft 64 journaled at 65 on the bed or base 10 and this shaft has connection with the fluid release valve of the jack 11 so that on actuation of the slide 57 the lowering of the jack may be had.

The slide 58 has the inner end portion upwardly offset at 66 to ride upon a guide pin 67 on a bracket 68 stationarily fixed to and rising from the bed or base 10 and this end 66 is formed with upstanding abutment lugs or nibs 69 and 70, respectively, one being at one side of the lever 40 and the other at the other side thereof and in this manner the said lever 40 can be shifted on its pivot 41 into and out of the path of the swing of the arm 45 so that the turning shaft 43 when rotated may independently operate the jack pump 48 or operate concurrently therewith the line indicator.

In Figures 9, 10 and 11 of the drawings, there are shown three separate and distinct adjusted positions of the slides 57 and 58 constituting the controls for the device or mechanism in regulating the action of the jack and the line indicator.

The plate 14 has cut therein the slots 71 for the fitting of the grips 17 therein while the lower portion of the plate has formed therein the slots 72 for the adjustable fitting of an auxiliary book or sheet rack 73 with the said plate 14 constituting the writing support, the auxiliary rack 73 being shown in Figure 18 of the drawings and is for the actuation of smaller sheets or books to be supported in the device or mechanism. The grips 17 when fitting the slots 71 will engage these small sheets or book for the holding of the same at rest on the support.

In Figures 16 and 17 of the drawings there is shown a slight modification of control for the line indicator, wherein a horizontally supported rotatable shaft 74 fitting bearings 75 has fixed thereto the tape reel 76 and the coil spring pulley 77, respectively, these operating similarly to the reel 28 and pulley 29 while the said shaft 74 has thereon a peripherally knurled wheel 78 engageable at its periphery by a friction dog or pawl 79 pivoted at 80 to and between a pair of side links 81 loosely fitting the shaft 74 at opposite sides of the wheel 78 and this dog or pawl 79 is operated upon by an arm 82 fixed to a turnable control shaft 83 identical to the shaft 43 and in this manner when the latter is turned the tape 84, the equivalent of the tape 30, will be wound in a step by step manner upon the reel 76 for the contracting of the lazy-tongs 21 and thus moving the line indicating bar 24 successively from line to line of the writing upon the support constituted by the plate 14 and in this fashion a copyist at a glance can identify the line of the writing to be copied in the use of a typewriter or by long hand or otherwise.

The shaft 43 at the handle 44 end has fitted therewith a coiled tensioning spring 85 which avoids longitudinal thrust of this shaft when being actuated or any undue displacement longitudinally thereof during the working of the same.

The lazy-tongs 21 in the mounting thereof in the bearing 22 allows the swinging of the line indicator close to or away from the support constituted by the plate 14 and when the same is active for line indication it is arranged close to the writing upon the support for clear indication or identification of a line of such writing to be copied.

To one of the links 81 is connected a retractile spring 86 which brings both links 81 normally in engagement with a rest post 87 to which the spring 86 is also attached so that when the dog or pawl 79 is swung upwardly at its rear end on the pivot 80, it will engage with the wheel 78 and the links 81 will be carried upwardly with the pawl or dog for the proper turning of the shaft 74 in effecting the winding of the tape 84 upon the reel 76. The dog or pawl 79 is limited in the lowering movement thereof at the rear end by a stop 88 carried by one of the links 81.

When the device or mechanism is in use for copying purposes and the jack 11 has been actuated for the positioning of the writing to be copied as carried by the support constituted by the plate 14, the lazy-tongs 21 having been extended to the first line of such writing, and it is desired that the line indicator be actuated it is required that the shaft 43 be turned at the handle 44 end of the same. This effects a single step contraction of the lazy-tongs on a single turn of the shaft 43 and thereby dropping or lowering the bar 24 one line with relation to the writing to be copied and in this manner indicating to the copyist the particular line to be copied. Of course, if the jack 11 is set in action, the support as constituted by the plate 14 can be raised in a step by step manner and in this event the line indicator will be rendered passive or inactive by means of the slide 58 yet by the step by step movement of the jack and the support the said passive or inactive line indicator will identify on the writing upon the support the line to be copied therefrom as the jack will carry the writing upwardly in single line order of the writing relative to the inactive or passive line indicator in the association thereof with the support.

Furthermore, by the actuation of the jack 11 for the raising of the support the proper locating of the writing to be copied upon the latter can be readily had for coaction with such writing of the line indicator including the lazy-tongs 21.

The jaw 37 is operated through the lever 40, this being actuated from shaft 43 through manual manipulation of the hand crank 44 and the tape 30 trained through the guide slot 38 is free from gripping action by the jaw 37 when the hand crank 44 is in normal inactive position, being understood of course that the force of the spring 33 equals that of the spring 25, so that the lazy-tongs can be manually extended or contracted to shift the line indicator at the desired line of the writing of the copy work.

It is, of course, understood that with regard to the grips 17, these are adaptable for positioning on the plate 14 with respect to any of the slots in the upper portion of the said plate to care for different sizes of copy work.

The auxiliary rack 73 preferably has arranged at proper points thereof swinging leaf spring-like holders or clamps 88' which are turned to overlie the lowermost edge or edges of a book or sheet so as to retain the latter at rest upon the rack and from working off of the same.

What is claimed is:

1. A device of the character described comprising a copy support-carrying jack having a pump, a manually actuated lever having connection with the pump for operation thereof, a normally extended contractible line indicator mounted for vertical swinging movement forwardly of the copy support of said jack, means for contracting the indicator from its extended position, means for imparting step by step movement to the contracting means and actuated by the manually actuated lever, and means manually controlled for moving the imparting means into active or inactive relation to the said lever.

2. A device of the character described comprising a copy support-carrying jack having a pump provided with a release valve, a manually actuated lever having connection with the pump for operation thereof, a normally extended contractible line indicator mounted for vertical swinging movement forwardly of the copy support of said jack, means for contracting the indicator from its extended position, means for imparting step by step movement to the contracting means and actuated by the manually actuated lever, means manually controlled for moving the imparting means into active or inactive relation to the said lever, and means manually controlled for actuating the pump release valve.

3. A device of the character described comprising a copy support-carrying jack having a pump provided with a release valve, a manually actuated lever having connection with the pump for operation thereof, a normally extended contractible line indicator mounted for vertical swinging movement forwardly of the copy support of said jack, means for contracting the indicator from its extended position, means for imparting step by step movement to the contracting means and actuated by the manually actuated lever, means manually controlled for moving the imparting means into active or inactive relation to the said lever, means manually controlled for actuating the pump release valve, and means normally maintaining the said lever in an inactive set position.

4. A device of the character described comprising a copy support-carrying jack having a pump provided with a release valve, a manually actuated lever having connection with the pump for operation thereof, a normally extended contractible line indicator mounted for vertical swinging movement forwardly of the copy support of said jack, means for contracting the indicator from its extended position, means for imparting step by step movement to the contracting means and actuated by the manually actuated lever, means manually controlled for moving the imparting means into active or inactive relation to the said lever, means manually controlled for actuating the pump release valve, means normally maintaining the said lever in an inactive set position, and means coacting with the line indicator for automatically extending the same to its normal extended position.

5. A device of the character described comprising a jack, a copy supporting plate raised and lowered by said jack, line indicator means arranged forwardly of the plate, manually controlled means for operating the jack, means operative for effecting a step by step movement to the line indicator means, and means operating the last-named means and actuated by the manually controlled means for operating the jack.

6. A device of the character described comprising a jack, a copy supporting plate raised and lowered by said jack, line indicator means arranged forwardly of the plate, manually controlled means for operating the jack, means operative for effecting a step by step movement to the line indicator means, means operating the last-named means and actuated by the manually controlled means for operating the jack, and means controlling the means which operate said last-named means for rendering the same inactive or active with the manually controlled means for operating the jack.

7. A device of the character described comprising a jack, a copy supporting plate raised and lowered by said jack, line indicator means arranged forwardly of the plate, manually controlled means for operating the jack, means operative for effecting a step by step movement to the line indicator means, means operating the last-named means and actuated by the manually controlled means for operating the jack, means controlling the means which operate said last-named means for rendering the same inactive or active with the manually controlled means for operating the jack, and an extensible and contractible lazy-tong included in said line indicating means.

8. A device of the character described comprising a jack, a copy supporting plate raised and lowered by said jack, line indicator means arranged forwardly of the plate, manually controlled means for operating the jack, means operative for effecting a step by step movement to the line indicator means, means operating the last-named means and actuated by the manually controlled means for operating the jack, means controlling the means which operate said last-named means for rendering the same inactive or active with the manually controlled means for operating the jack, an extensible and contractible lazy-tong included in said line indicating means, and means supporting the said lazy-tong for swing about a horizontal axis.

9. A device of the character described comprising a jack, a copy supporting plate raised and lowered by said jack, line indicator means arranged forwardly of the plate, manually controlled means for operating the jack, means operative for effecting a step by step movement to the line indicator means, means operating the last-named means and actuated by the manually controlled means for operating the jack, means controlling the means which operate said last-named means for rendering the same inactive or active with the manually controlled means for operating the jack, an extensible and contractible lazy-tong included in said line indicating means, means supporting the said lazy-tong for swing about a horizontal axis, and means for normally extending said lazy-tong.

CAREY J. MEEK.